(12) United States Patent
Klein et al.

(10) Patent No.: US 6,660,415 B2
(45) Date of Patent: Dec. 9, 2003

(54) METHOD FOR IMPROVING THE LIGHT-OFF PERFORMANCE OF MOBILE FUEL CELL SYSTEMS

(75) Inventors: Christian Klein, Kirchheim u. Teck (DE); Martin Schuessler, Ulm (DE)

(73) Assignee: Ballard Power Systems AG, Kirchheim (DE)

( * ) Notice: Subject to any disclaimer, the term of this patent is extended or adjusted under 35 U.S.C. 154(b) by 135 days.

(21) Appl. No.: 09/837,748

(22) Filed: Apr. 19, 2001

(65) Prior Publication Data

US 2002/0001740 A1 Jan. 3, 2002

(30) Foreign Application Priority Data

Apr. 20, 2000 (DE) .......................................... 100 19 770

(51) Int. Cl.$^7$ .......................... H01M 8/00; H01M 8/04; H01M 8/12; C01B 3/02; C01B 3/24
(52) U.S. Cl. .............................. 429/13; 429/17; 429/24; 423/648; 423/650
(58) Field of Search ............................... 429/12, 13, 17, 429/20, 24, 34, 38, 39; 423/644, 648.1, 650, 651, 655

(56) References Cited

U.S. PATENT DOCUMENTS

| | | | | |
|---|---|---|---|---|
| 5,110,559 A | * | 5/1992 | Kondo et al. ................ 422/109 |
| 5,629,102 A | * | 5/1997 | Werth ............................ 429/17 |
| 5,669,216 A | * | 9/1997 | Ankersmit et al. ............ 60/778 |
| 5,686,196 A | * | 11/1997 | Singh et al. .................... 429/17 |
| 5,904,913 A | * | 5/1999 | Bohm et al. ............. 423/648.1 |
| 5,928,805 A | * | 7/1999 | Singh et al. .................... 429/13 |
| 6,159,256 A | * | 12/2000 | Bonville et al. ................ 48/61 |
| 6,276,473 B1 | * | 8/2001 | Zur Megede ............... 180/65.2 |
| 6,331,694 B1 | * | 12/2001 | Blankenship ......... 219/137 PS |
| 6,376,113 B1 | * | 4/2002 | Edlund et al. ................. 429/19 |
| 6,410,175 B1 | * | 6/2002 | Tillmetz et al. ................ 429/13 |
| 6,429,019 B1 | * | 8/2002 | Goldstein et al. ........... 436/134 |
| 6,463,889 B2 | * | 10/2002 | Reddy ............................ 123/3 |

* cited by examiner

Primary Examiner—Randy Gulakowski
Assistant Examiner—Donald V. Scaltrito
(74) Attorney, Agent, or Firm—Crowell & Moring LLP

(57) ABSTRACT

In a method for improving cold starting of a catalytically active component in gas generation systems for a mobile fuel cell system, a temporary store is arranged directly in the starting-material gas stream. During cold starting, the temporary store stores gaseous constituents from the gaseous starting material, which constituents cause problems when starting, and releases such constituents (which have been stored during the cold-start phase) again as a result of the heating which takes place as operation of the system continues.

13 Claims, 1 Drawing Sheet

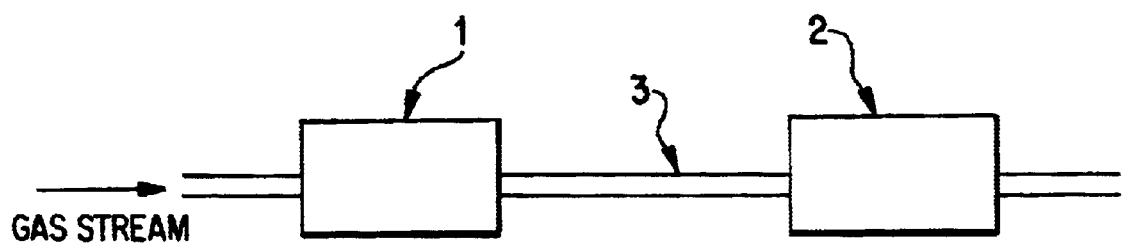

METHOD FOR IMPROVING THE LIGHT-OFF PERFORMANCE OF MOBILE FUEL CELL SYSTEMS

CROSS-REFERENCE TO RELATED APPLICATIONS

This application is related to co-pending U.S. patent application Ser. No. 09/837,421

BACKGROUND AND SUMMARY OF THE INVENTION

This application claims the priority of German patent document 100 19 770.1, filed Apr. 20, 2001, the disclosure of which is expressly incorporated by reference herein.

The invention relates to an improved method and apparatus for improving cold-starting of catalytically active components in gas generation systems of mobile fuel cell systems.

It is known that catalytically active components (for example a CO oxidation stage) in gas generation systems are difficult to start at temperatures below the operating temperature, on account of the catalytically active centers being filled. Filling with CO or condensing constituents such as water or fuel (e.g., methanol) has caused particular problems, since it may impede the mass transfer (and therefore the catalytic activity) in the catalytically active component. In the case of water, at low temperatures icing of the catalyst may occur.

To heat catalytically active components rapidly to operating temperature, it is known to burn fuel either inside or outside the particular component which is to be heated. Another possible option is to burn fuel in a further component which is in thermal contact with the component to be heated.

It is an object of the invention to provide a method for quick and reliable cold-starting of catalytically active components in gas generation systems.

This and other objects and advantages are achieved by the method according to the invention, in which a temporary store is arranged directly in the starting-material gas stream. This storage unit stores gaseous constituents from the starting material of the component that is to be started, which constituents cause difficulties when starting, and therefore protects this component from bing filled by these constituents. It is possible in particular to store CO and condensing constituents such as water or fuel (in particular methanol).

As a result of the ongoing heating of the system as operation continues, in particular after the operating temperature (which is typically 200° C.–300° C.) has been reached, the temporary store releases the stored components again, and thus regenerates itself for the next cold start.

The temporary store therefore performs a type of buffer function, is thus also referred to in the text which follows as a buffer.

The temporary store according to the invention can be used in particular to protect the following components within a gas generation system:

a catalytic burner for controlling the temperature of the system;

a reformer for fuel gas generation for the fuel cell;

a reactor for the partial oxidation for fuel gas generation; and a CO oxidation stage or a membrane for cleaning the fuel gas.

The method according to the invention is particularly suitable for protecting components in which an exothermic reaction takes place.

The buffer according to the invention can be designed as a combination of a plurality of storage components, the individual components being selectively suitable or optimized for storing a specific substance.

Furthermore, the temporary store may comprise components which operate on the basis of different chemical-physical storage principles.

In a preferred embodiment, the temporary store is designed as an adsorber.

In an advantageous embodiment, the temporary store is an adsorber with a large surface area and Cu-containing support material, for example a zeolite. Other suitable materials are $Al_2O_3$ or activated carbon. Such materials are particularly well suited to the adsorption of CO, but may also be used for the adsorption of methanol or water.

The method according to the invention is particularly beneficial if, in a component which is to be protected from CO, the catalytic material of this component is on a metallic or ceramic support structure (monoliths, metal sheets), since the high heat absorption capacity of these structures makes it very difficult for the catalyst to be ignited in CO-containing gas.

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing shows the flow of gas through the buffer and through the component which is to be protected within the gas generation system.

DETAILED DESCRIPTION OF THE DRAWINGS

Reference numeral 1 indicates the temporary store which is arranged directly in the gas stream, upstream of a catalytically active component 2, for example a CO oxidation stage. The temporary store 1 and the catalytically active component 2 are connected via the line 3.

During the cold start, the gas mixture, which includes CO, water or fuel, flows into the buffer 1, where the gaseous constituents which impede the catalytic activity of the downstream component 2 during the cold start are removed from the gas mixture as a result of the gaseous constituents being stored, for example absorbed, in the buffer 1. Downstream of the buffer 1, the gaseous mixture which now has a reduced concentration of CO, water or fuel flows through line 3 into the catalytically active component 2. The mass transfer and therefore the catalytic activity of the component 2 are not impeded by the gas mixture which has been cleaned in the buffer 1. This ensures that the component 2 starts reliably.

While the gas generation system is operating, the catalytically active component 2 reaches its operating temperature as a result of the exothermic reaction proceeding therein. At the same time, the starting-material gas stream is flowing through the buffer 1. In normal operation, the latter gas stream is hot, having been heated during an upstream evaporation operation. Accordingly, the temperature of the buffer 1 rises due to a transfer of thermal energy from the gas stream which flows through it, as indicated by the arrow. On account of this increase in temperature, the buffer 1 then releases the stored constituents and passes them to the gas stream and therefore to the component 2 which is now ready for operation. The buffer 1 is then once again ready to take up gaseous constituents during the next cold start.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for starting a catalytically active component in a gas generation system of a fuel cell system, comprising:

directing a process gas stream to said catalytically active component via a buffer located upstream of said catalytically active component whereby, during a starting phase, the buffer temporarily stores at least one constituent of said process stream that impedes the catalytic activity of said catalytically active component below its normal operating temperature; and as its temperature increases after said starting phase, the buffer releases said at least one constituent into said process stream.

2. The method according to claim 1, wherein said fuel cell system is a mobile fuel cell system.

3. A method according to claim 1, wherein the buffer contains an adsorbent.

4. The method according to claim 1, wherein the buffer contains at least one material selected from the group consisting of Cu-containing materials, zeolites, $Al_2O_3$ and activated carbon.

5. The method according to claim 1, wherein the at least one constituent which is temporarily stored in the buffer comprises at least one of CO, water and methanol.

6. The method according to claim 5, wherein the buffer comprises a plurality of components, each of which selectively stores a different individual constituent of said process stream.

7. The method according to claim 1, wherein the catalytically active component is one of a catalytic burner, a reformer, a partial oxidation stage, a CO oxidation stage and a membrane for gas cleaning.

8. A gas generation system for a fuel cell system, comprising:

a gas generator having a catalytically active component whose catalytic activity is impaired below its normal operating temperature by presence of particular constituents in a process stream flowing thereto; and a buffer arranged in said process stream flow oath upstream of said catalytically active component, said buffer being capable of temporarily storing said particular constituents during starting of said gas generator system, and releasing said particular constituents when said gas generation system reaches its normal operating temperature.

9. The gas generation system according to claim 8, wherein the buffer comprises an adsorbent.

10. The gas generation system according to claim 8, wherein the buffer comprises at least one material selected from the group consisting of Cu-containing materials, zeolites, $Al_2O_3$ and activated carbon.

11. The gas generation system according to claim 8, wherein the buffer comprises a plurality of components, each of which selectively stores a different individual constituent of said process stream.

12. The gas generation system according to claim 8, wherein the catalytically active component is one of a catalytic burner, a reformer, a partial oxidation stage, a CO oxidation stage and a membrane for gas cleaning.

13. A gas generation system, comprising:

a catalytically active component;

gas delivery means for supplying a flow of a process stream to said catalytically active component for generating a fuel gas therefrom; and a buffer disposed in the flow path of said process stream; wherein, said buffer comprises material that, during starting of said catalytically active component, temporarily stores at least one constituent of said process stream, which impedes said starting, and releases said stored at least one constituent back into said process stream as a result of heating due to operation of the catalytically active component.

* * * * *